Feb. 12, 1935.　　　　G. DOBSON　　　　1,990,530
STEERING MECHANISM FOR VEHICLES
Filed June 29, 1933　　　2 Sheets-Sheet 1
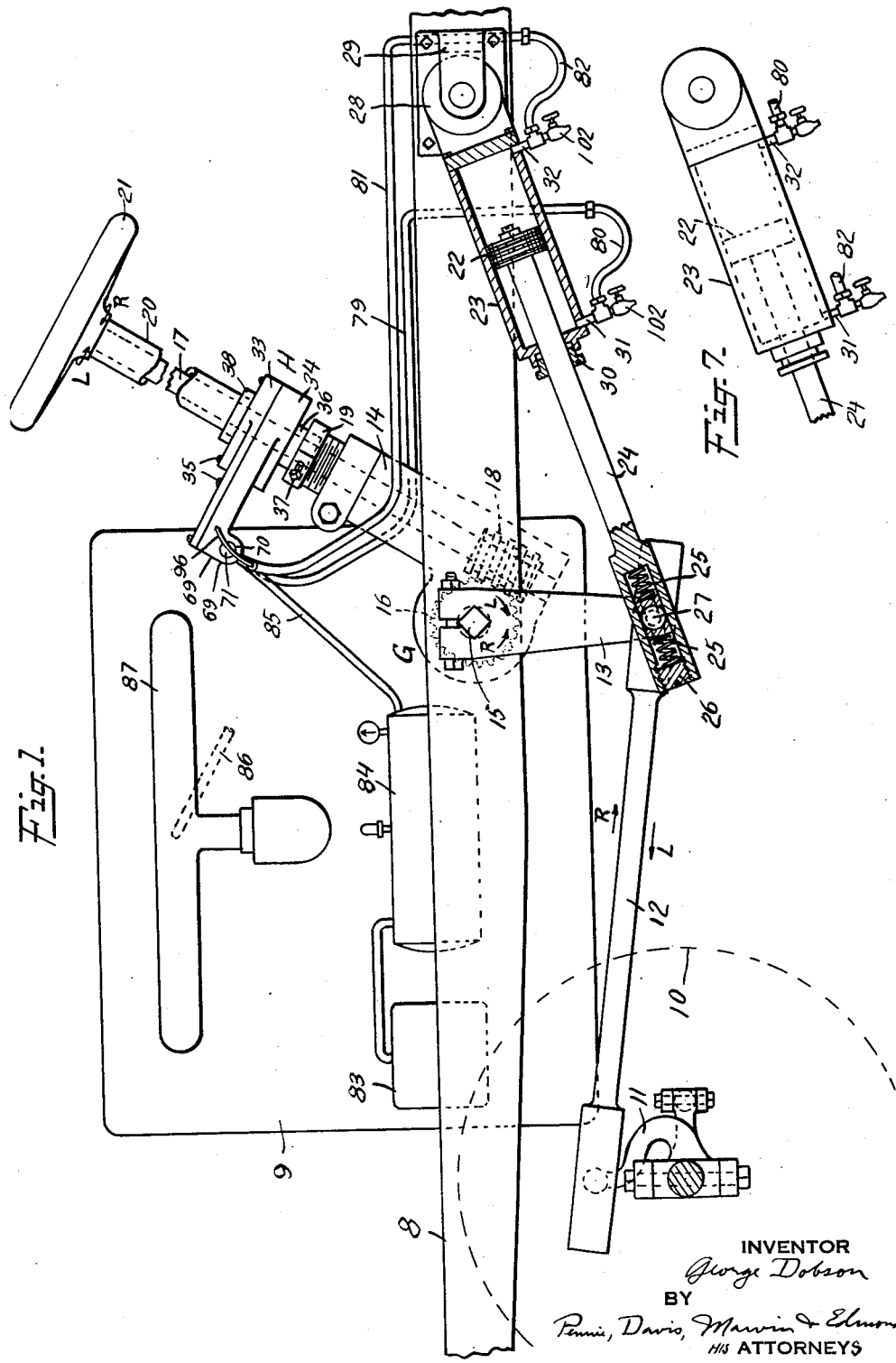
INVENTOR
George Dobson
BY
Pennie, Davis, Marvin & Edmonds
HIS ATTORNEYS Feb. 12, 1935. G. DOBSON 1,990,530
STEERING MECHANISM FOR VEHICLES
Filed June 29, 1933 2 Sheets-Sheet 2
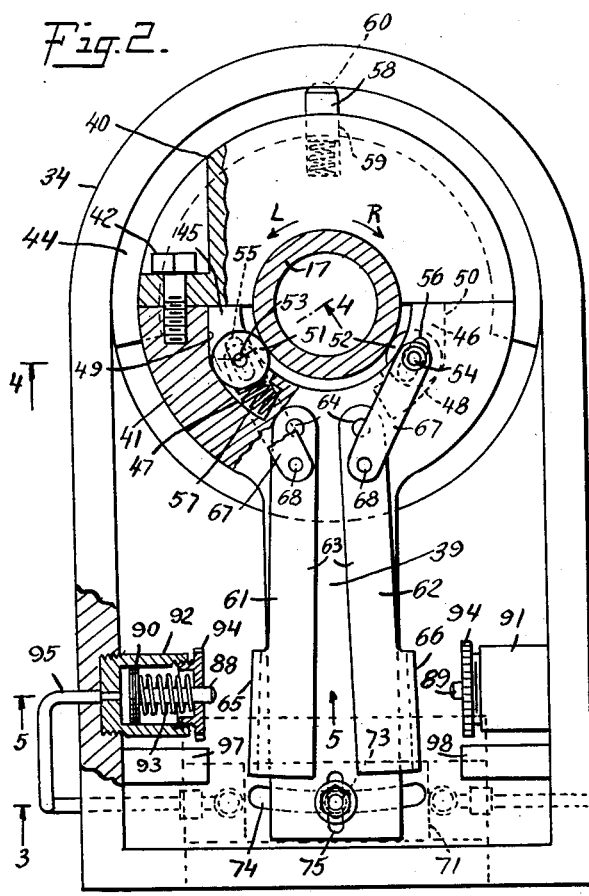

Patented Feb. 12, 1935

1,990,530

UNITED STATES PATENT OFFICE 1,990,530

STEERING MECHANISM FOR VEHICLES

George Dobson, New York, N. Y.

Application June 29, 1933, Serial No. 678,107

18 Claims. (Cl. 180—79.2)

This invention relates to steering mechanisms, and more particularly concerns a power booster for use in conjunction with manual steering gears of road vehicles, such as automobiles, busses or trucks.

In the operation of road vehicles, and particularly power driven vehicles, such as automobiles, busses and trucks, the turning of the hand-operated steering wheel to cause pivotal movement of the dirigible vehicle wheels and so change the direction of vehicle movement entails considerable physical effort. The manual power required to turn the wheels is particularly burdensome on heavy vehicles, such as busses and trucks, and is also of considerable magnitude in passenger cars using large low pressure tires of the type now in vogue. Even with the lighter vehicles, the resistance to pivotal movement of the dirigible wheels is considerable when the vehicle is stationary, or is moving at a very low speed as in parking or in negotiating narrow and tortuous streets.

It is the object of the present invention to provide an improved steering system including a power-operated device or booster for supplementing or supplanting the manual effort ordinarily required to steer a road vehicle. More specifically, the present invention contemplates the provision of a system of this type in which the steering movement of the dirigible vehicle wheels is positively and accurately controlled by the driver in the usual manner, and in which no drag or other resistance to manual movement or control of the steering mechanism is imposed by either the power-operated means or the control means therefor. Thus the invention provides a system in which the mechanical connection between the hand steering wheel and the dirigible vehicle wheels is direct and free from all slack or lost motion and in which the action of the power-operated means in turning the dirigible vehicle wheels may be accurately arrested or terminated by the driver at the desired point without any abnormal manipulation or movement of either the hand steering wheel or the dirigible vehicle wheels.

Among the other objects of the invention is that of providing a system of the type described in which the power means may be operated by fluid under either high or lower pressure, in other words, by either fluid pressure or vacuum. The invention also contemplates the provision of a power steering system which may be easily applied to the standard manual steering mechanisms of motor vehicles without substantial change in such mechanisms.

The above and other objects of the invention are carried out by providing a reversible fluid motor connected to the element, usually the drag link, which moves the dirigible vehicle wheels, and by controlling the supply of motive fluid to this motor by manual movement of the hand steering wheel. Thus I prefer to provide a valve mechanism adjacent the hand steering wheel shaft, this mechanism being operated to supply motive fluid to operate the steering motor in a direction determined by and corresponding to the direction in which the hand wheel is turned. My improved valve mechanism is so designed that after the valve is operated by movement of the steering shaft, the valve mechanism is at once released from the shaft and accordingly does not impose any resistance or drag to impede further movement of the steering mechanism. Improved means for rendering the fluid motor inactive after the desired operation are also provided. Thus after the steering mechanism has been turned the desired amount in a given direction and the hand wheel is held stationary by the driver, means are actuated in response to this stationary condition of the hand wheel and its connected mechanism for cutting off the flow of power fluid to the motor. In one embodiment of my invention, the valve mechanism is operated to cut off the motive fluid after the desired movement under power by means responsive to the degree of motive fluid pressure in the operating cylinder of the motor. Thus when a high pressure motive fluid is employed, after the motor has turned or assisted in turning the dirigible vehicle wheels to the desired extent, the hand wheel is held stationary and further movement of the fluid motor is prevented by the irreversible nature of the manual steering mechanism connecting the hand wheel to the drag link. This resistance to further operation of the motor causes the fluid pressure to build up within the motor cylinder and means are operated by this augmented fluid pressure for moving the valve mechanism to the neutral position in which the source of motive fluid is disconnected from the motor. The valve mechanism may subsequently be moved in either direction from the neutral position upon turning of the hand wheel, and hence after each operation of the power means has been completed, the mechanism is ready for further operation in either direction.

The invention will be best understood by reference to the accompanying drawings, in which a typical embodiment thereof has been illustrated. In the drawings:

Figure 1 is an elevation, partly in section, of my improved system applied to a motor vehicle;

Figure 2 is a top plan view of the valve operating mechanism of my system with the cover removed and certain parts broken away to show the construction;

Figure 3 is a sectional view of the valve mechanism, taken along the line 3—3 of Figure 2;

Figure 4 is a sectional view, taken along the line 4—4 of Figure 2 and viewed in the direction of the arrows;

Figure 5 is a sectional view of the valve operating arm centering means, taken along the line 5—5 of Figure 2 and viewed in the direction of the arrows;

Figure 6 is a sectional view similar to Figure 5 and showing a valve arm centering plunger for use with a vacuum motive fluid; and Figure 7 is a sectional elevation of the fluid motor connected for use with a vacuum motive fluid.

Referring to the drawings, I have disclosed my improved steering system as applied to a motor vehicle of conventional design, and it should be understood that the vehicle with which the system is used may comprise a truck, bus, passenger car or any other road vehicle. The vehicle disclosed includes the usual chassis frame 8, carrying the motor 9 and the dirigible front wheels 10, the dirigible wheels being connected through an arm 11 and a drag link 12 to the pitman arm 13 of a conventional worm and pinion type steering gear G. This steering gear, as known in the art, comprises a housing 14 fixed to the frame 8 and carrying a transverse stub shaft 15 journaled therein and passing through the frame. The stub shaft 15 carries a pinion 16 within the housing 14 and a steering shaft 17 is also journaled in the housing and carries a worm 18 which meshes with the pinion 16. The pitman arm 13 is fixed to a squared end of the stub shaft 15 as shown. The steering shaft 17 extends upwardly from the gear housing 14 through an adjusting nut 19, passes through a steering column shell 20 and terminates in a steering wheel 21. The apparatus thus far described constitutes one form of conventional manual steering gear used on motor vehicles.

In accordance with my invention, I prefer to provide a steering gear of the irreversible type and thus the pitch of the worm 18 and of the teeth on the pinion 16 is so chosen that forces acting on the dirigible vehicle wheels 10 or on the pitman arm 13 are incapable of causing rotation of the worm 18 and the steering shaft 17 connected thereto. Irreversible steering gears of this type are standard equipment on substantially all motor vehicles. I further prefer to provide a mechanical connection between the steering wheel 21 and the dirigible vehicle wheels 10 which has substantially no slack or lost motion therein. Thus the only lost motion in the various mechanical connections is that necessary for free operation or resulting from wear and use, and any excessive lost motion is taken up periodically in accordance with usual maintenance practice.

In accordance with the invention, I provide a fluid motor connected to apply power to move or to assist in moving the dirigible vehicle wheels. Various types of fluid motors may be used, and in the disclosed embodiment, I have shown a motor comprising a double acting piston 22 carried in a cylinder 23 and connected through a rod 24 with the lower end of the pitman arm 13. The connection between the pitman arm 13 and the rod 24 may be of a flexible nature, although this arrangement is not essential to the operation of my system. As shown, two heavy coiled springs 25 held by a plug 26 are disposed within a recess in the end of the rod 24 on opposite sides of a ball shaft 27 fixed to the pitman arm 13 and passing through the slot in the side of the piston rod recess as shown. The cylinder 23 is attached at its upper end to the chassis frame 8 through a pivoted connection comprising a self-aligning bearing 28 carried by a yoke 29. With this arrangement, the cylinder 23 and piston rod 24 may move in a vertical plane about the bearing 28 to follow the motion of the ball shaft 27 as the pitman arm 13 turns with the stub shaft 15. The piston rod 24 enters the cylinder 23 through a packing gland 30 of usual construction. Motive fluid ports 31 and 32 are provided at opposite ends of the cylinder 23 to permit passage of the motive fluid to and from the cylinder under the control of a valve mechanism, as hereinafter described.

The control valve mechanism of my improved steering system is preferably mounted on or adjacent the steering shaft 17. As shown in the drawings, the valve mechanism casing H comprises two parts 33 and 34 connected together by suitable means, such as the screws 35, the casing H surrounding the steering shaft 17. The lower casing part 34 carries a shoulder 36 which is clamped within an annular recess in the upper end of the adjusting nut 19 by means of a set screw 37. The steering column shell 20 is cut away to a point substantially even with the top of the upper casing part 33, and the end of this shell is held within a boss 38 on the part 33, as shown in Figure 4.

Referring now to the construction of the valve operating mechanism, as best shown in Figures 2, 3 and 5, the steering shaft 17 which passes through the casing H is surrounded by the head of a valve operating arm 39. The head of this arm is preferably split to permit each application thereof to the shaft 17 and comprises a substantially semi-circular cap 40 secured to a complementary semi-circular part 41 integral with the arm 39, suitable means, such as the machine screws 42, being employed to secure the parts 40 and 41 together. The head of the valve operating arm is rotatably journaled on the steering shaft 17 and is carried between the shoulders 43 and 44 which are respectively located on the casing parts 33 and 34, as shown in Figures 2 and 4.

A spring pressed latch 58 is preferably provided in a recess 59 in the part 40, this latch extending radially from the valve arm head and cooperating with a latch groove 60 in the inner wall of the casing H. The position of the groove 60 and latch 58 is such that the arm 39 is held in its central or neutral position when the latch is in the groove.

The part 41 of the valve operating arm head is provided with two recesses 45 and 46 which are centrally disposed axially of the shaft 17 in this part, as shown in Figure 4. The recesses have outer walls which are concentric with the shaft 17 for a portion of their extent, as shown at 47 and 48, but which are tapered toward the shaft at their outer portions, as shown at 49 and 50 in Figure 2. Thus each of the recesses 45 and 46 comprises a passage between the shaft 17 and the part 41 which tapers down or has a decreasing radial width as the recess approaches the face of the part 41.

Locking rollers 51 and 52 are respectively disposed in the recesses 45 and 46 with their axes parallel to that of the shaft 17. These rollers have a diameter less than the radial width of the recesses at the points 47 and 48 but greater than the minimum radial width of the recesses at the points 49 and 50. The rollers 51 and 52 are respectively carried by shafts 53 and 54 which pass through arcuate slots 55 and 56 in the part 41, as shown in Figures 2 and 4. A coiled spring 57 is provided in the arcuate portion of each of the recesses 45 and 46 to urge the rollers 51 and 52 toward the narrow ends of the recesses.

Two releasing levers 61 and 62 are provided on the arm 39 to control the locking rollers 51 and 52 respectively. Each of these releasing levers is bifurcated, having parallel arms 63 pivotally connected to the arm 39 by the pins 64 and connected by cross pieces 65 and 66 adjacent the outer end of the arm 39. The arms 63 of the releasing levers 61 and 62 embrace the opposite edges of the valve operating arm 39, as shown in Figures 3 and 5. A pair of links 67 is connected between pins 68 on the arms 63 of each of the levers 61 and 62 and the shafts 53 and 54 of the adjacent locking rollers 51 and 52. With this arrangement, movement of either of the levers 61 or 62 inward with respect to the valve operating arm 39 by the force applied to the cross piece 65 or 66 results in the links 67 drawing one of the rollers 51 or 52 into the wide portion 47 or 48 of the roller recesses 45 or 46 against the opposition of the spring 57 thereby releasing the driving connection between the steering shaft 17 and the valve operating arm 39. Movement of the shaft 17 in a clockwise direction, as indicated by the arrow R in Figure 2, causes the roller 51 to jam between the shaft 17 and the tapered portion 49 of the recess 45, thus locking the arm 39 to move with the shaft 17. Similarly, movement of the shaft 17 in counter-clockwise direction, as indicated by the arrow L in Figure 2, causes the roller 52 to jam between the shaft 17 and the tapered portion of the recess 46 and thus lock the arm 39 to move with the shaft 17.

Two stops or abutments 97 and 98 are respectively disposed on opposite sides of the valve operating arm 39 within the casing H, these stops being respectively arranged to engage the cross pieces 65 and 66 of the levers 61 and 62 and so move these levers inwardly against the arm 39 to release the corresponding locking rollers 51 or 52 when the arm 39 is swung to an extreme position in either direction.

The valve mechanism proper is contained in an offset portion 69 of the casing part 34, as best shown in Figure 3. A valve recess 70 in this offset portion 69 carries a valve slide 71 having a motive fluid passage 72 therein. The valve slide 71 is operatively connected to the valve operating arm 39 by a pin 73 passing through an arcuate slot 74 in the wall of the casing part 34 and through a vertical slot 75 in the valve operating arm 39, as shown in Figures 2 and 3. By reference to Figure 3, it will be clear that movement of the valve slide 71 to its extreme position in the direction of the arrow R causes the passage 72 to connect the power fluid port 76 with the port 77 and movement of the slide 71 to the opposite extreme position in the direction of the arrow L causes the passage 72 to connect the power fluid port 76 with the port 78. When in the neutral position as shown, the valve slide 71 closes the power fluid port 76 and vents the ports 77 and 78 to atmosphere through the ends of the valve recess 70.

When the system is used with a super-atmospheric pressure motive fluid, such as compressed air, the valve port 77 is connected by the pipe 79 and the flexible hose 80 to the port 31 of the power cylinder 23, and the valve port 78 is connected through the pipe 81 and the flexible hose 82 to the power cylinder port 32. When the system is used with motive fluid at sub-atmospheric pressure, the connections between the valve ports 77 and 78 and the cylinder ports 31 and 32 are reversed, as shown in Figure 7, the hose 80 of the pipe 79 being connected to the cylinder port 32 and the hose 82 of the pipe 81 being connected to the cylinder port 31.

Drain cocks 102 are preferably provided at the power cylinder ports 31 and 32 to permit the draining of any condensed moisture which may accumulate in the cylinder 23.

The motive fluid for operating the system may be either a fluid at super-atmospheric pressure, such as compressed air, or a fluid at sub-atmospheric pressure or vacuum. When compressed air is used, it may be supplied by any suitable means such as a motor driven compressor 83 connected to a storage reservoir 84 which in turn is connected to the pipe 85 leading to the motive fluid port 76 of the valve. When sub-atmospheric pressure motive fluid is employed, the pipe 85 may be connected through the pipe 86 to the intake manifold 87 of the motor 9, since as is well known, a vacuum is created in the intake manifold of an internal combustion engine when in operation.

My improved system includes means for automatically returning the valve mechanism and its operating means to a neutral position after each power operation of the steering mechanism. Thus, as shown in Figs. 2, 3 and 5, two valve centering plungers 88 and 89 are carried by pistons 90 in the cylinders 91 and 92 mounted within the casing H on opposite sides of the valve operating arm 39 adjacent its lower end. Each piston 90 is biased toward its plunger retracting position by a spring 93, and the initial compression of this spring is variably adjustable by a cap 94 threadedly connected to the cylinder 91 or 92. The outer ends of the cylinders 91 and 92 are respectively connected with motive fluid pipes 79 and 80 through the pipes 95 and 96. With this arrangement, it will be seen that when the fluid pressure in either pipe 79 or 81 exceeds a value determined by a setting of the spring 93, the plunger 88 or 89 will be extended and will engage the cross piece 65 or 66 on the releasing lever 61 or 62, and acting through such cross piece, will move the valve operating arm 39 to its central or neutral position, in which position the arm is held by the latch 58.

When the system is used with a motive fluid at subatmospheric pressure or vacuum, a slightly different type of valve centering plunger cylinder is used. Thus, as shown in Figure 6, each plunger 88' is connected to a piston 90' and passes through a packing gland 100 in the adjustable cylinder head 94' which regulates the compression of the spring 93'. The pipe 95 connected to the motive fluid pipe 79 enters the cylinder 92' at a point adjacent the head cap 94', and a vent 101 is provided for admitting air at atmospheric pressure to the outer end of the cylinder 92'. With this arrangement, when a predetermined degree of sub-atmospheric pressure or vacuum exists in the pipe 79 and is transmitted to the cylinder 92' by the pipe 95, the piston 90' and plunger 88' are moved against the opposition of the spring 93' by atmospheric pressure entering the vent 101, and the plunger 88' engages the cross piece 65 and through it moves the valve operating arm 39 to its central or neutral position.

Referring now to the operation of my improved system with motive fluid at super-atmospheric pressure, and assuming first that the vehicle driver wishes to make a right turn, he turns the hand steering wheel 21 to the right as indicated by the arrows R in Figures 1 and 2. With the initial movement of the wheel 21 and steering shaft 17, the locking roller 51 is wedged between the shaft 17 and the part 41 so that the valve operating arm 39 moves with the shaft 17, that is, to the left as viewed in Figures 2, 3 and 5. This movement of the arm 39 moves the valve slide 71 to a position in which its passage 72 connects the motive fluid port 76 with the port 77, and at this point, motive fluid, assumed in the present case to be compressed air or an equivalent fluid at super-atmospheric pressure, passes through the pipe 79 and hose 80 and enters the lower end of the cylinder 23, forcing the piston 22 upward in the cylinder and so causing the rod 24 to pull backward on the pitman arm 13. It will be apparent that this pull on the pitman arm assists in turning the dirigible wheels 10 to the right. When the driver has moved the wheel 21 and shaft 17 through an angle sufficient to operate the valve slide 71 as described, the cross piece 65 on the locking roller releasing lever 61 engages the stop 97 and is depressed against the arm 39 by such engagement, thereby releasing the locking roller and freeing the steering shaft 17 from the valve operating arm 39, as described above. With this arrangement, the valve operating arm 39 does not impose any drag on the steering mechanism which is released from the arm as soon as the valve operating function is completed.

As long as the driver continues to turn the wheel 21 to the right, the valve slide 71 remains in the operated position and the fluid motor continues to apply force to the pitman arm 13 to aid in turning the dirigible vehicle wheels 10 to the right. During this operation, the pressure of the motive fluid is applied through the pipe 95 to the centering plunger piston 90, but this pressure is insufficient to move the piston 90 against the opposition of the spring 93 so long as the power cylinder piston is in motion.

When the dirigible vehicle wheels have been turned the desired amount to the right, the driver stops turning the hand wheel 21 and holds it stationary in accordance with the practice of ordinary manual steering. The stationary condition of the steering shaft 17 and the worm 18 connected thereto locks the pitman arm 13 against further movement, due to the irreversible nature of the steering gear as described above. With the pitman arm 13 thus locked, the piston 22 is held stationary in the cylinder 23 and the motive fluid builds up by a high pressure in the forward end of the cylinder 23 and in the connected pipes 79 and 95. The spring 93 is so adjusted that this increased pressure is sufficient to overcome the resistance of the spring 93 and the plunger 88 is extended, moving the valve operating arm 39 through the cross piece 65 of the lever 61 to the central or neutral position where it is retained by the spring latch 58. This movement of the arm 39 to its neutral position moves the valve slide 71 to its central position, as shown in Figure 3, and thus vents the lower end of the power cylinder 23 to atmosphere through the pipe 79 and the valve recess 70. In this manner, the motive fluid is cut off from the power cylinder and the venting of both ends of this cylinder to atmosphere prevents any opposition of the fluid motor to a subsequent manual movement of the steering gear in either direction.

After the right turn operation described above, the valve operating mechanism having been automatically returned to its neutral position, the system is in condition to apply power to assist in making a subsequent turn in the same or the opposite direction. If the next turn of the steering mechanism is to the left, as would ordinarily be the case when the driver straightens out the course of the vehicle after the described right turn, the initial movement of the hand wheel 21 to the left, as indicated by the arrows L in Figures 1 and 2, results in the locking of the steering shaft 17 to the valve operating arm 39 through the roller 52, the movement of the arm 39 and valve slide 71 to the right, as indicated by the arrows L in Figure 3, and the release of the locking roller 52 as the cross piece 66 of the lever 62 strikes the stop 98. Movement of the valve slide 71 to the right causes the passage 72 to connect motive fluid from the pipe 85 through the pipe 81 to the upper port 32 of the cylinder 23, thus forcing the piston 22 and its rod 24 outward and thereby assisting in turning the dirigible vehicle wheels to the left. When the dirigible vehicle wheels 10 have been turned far enough to the left, the driver holds the hand wheel 21 stationary, thus locking the pitman arm 13 and piston 22, and whereupon the augmented motive fluid pressure which builds up in the upper end of the cylinder 23 and in the pipes 81 and 96 extends the centering plunger 89 against the pressure of the adjusted opposing spring, and thereby returns the valve operating arm to its central or neutral position. This movement of the valve operating arm 39 to neutral results in the shutting off of motive fluid supply from the fluid motor and the venting of the upper end of the cylinder 23 to atmosphere.

The operation of the system when using motive fluid at sub-atmospheric pressure is essentially the same as that described above in connection with motive fluid at super-atmospheric pressure. For vacuum or sub-atmospheric pressure operation, the pipe 85 is connected through the pipe 86 to the intake manifold 87, the pipe 78 and hose 80 are connected to the upper cylinder port 32 and the pipe 81 and hose 82 are connected to the lower cylinder port 31, as shown in Figure 7. Also, valve operating arm centering plungers of the type shown in Figure 6 are employed. With this arrangement, manual movement of the steering shaft 17, say to the right, moves the arm 39 and the valve slide 71 to the left, as viewed in Figures 2, 3 and 6, and thus connects the pipe 79 and the cylinder port 32 to the vacuum created in the motive fluid supply pipe 85 by the intake manifold 87. Air at atmospheric pressure enters the cylinder 23 through the port 31, pipe 80 and valve recess 70, and this pressure retracts the piston and thus applies force to the pitman arm 13 to aid in turning the dirigible vehicle wheels 10 to the right. When the hand wheel is held stationary after such right turn, the piston 22 is locked by the irreversible gears 16 and 18 as described above, and the degree of vacuum in the upper end of the cylinder 23 increases to a point where atmospheric pressure, acting against the piston 90′ in the cylinder 92′ is sufficient to overcome the resistance of the spring 93′ and move the plunger 88′ outward, thereby centering the valve operating arm 39 in its neutral position. It will be understood that the inner face of the piston 90' is subject to the same degree of vacuum as that obtaining in the cylinder 23, the connection being made through the pipe 95.

From the description given, it will be seen that my improved system presents many advantageous features. Thus the operation of the power booster means is entirely automatic and is properly governed by the usual manipulation of the steering wheel in driving. The system does not depend upon any lost motion or slack in the steering mechanism for the control of the power booster and hence is not subject to the shimmying or other undesired movement of the dirigible vehicle wheels which results when lost motion is employed. The valve operating mechanism is automatically released from the steering gear after operation of the valve, and hence does not impede the motion of the steering gear by imposing a drag thereon. Further, the valve and its operating mechanism are immediately and automatically centered or returned to a neutral position after each turn of the dirigible wheels and thus the system is always in condition to initiate further power operation when the hand steering wheel is subsequently turned in either direction. The device is well adapted for use with motive fluid at either super-atmospheric or sub-atmospheric pressure, and the valve action is such that the power cylinder is completely vented to atmosphere when not applying power. Due to this venting, the power cylinder does not interpose any resistance to the initial manual movement of the steering gear. My system may be quickly and easily applied to standard vehicle steering gears without substantial alteration thereof and without in any way weakening the construction or altering the mode of operation of the standard manual gear.

The term "motive fluid" as employed in the appended claims, embraces both fluids under super-atmospheric pressure and fluids under sub-atmospheric pressure or vacuum as well. Where the appended claims call for a direct mechanical connection between the hand steering wheel and either the dirigible vehicle wheels or a dirigible vehicle wheel moving element, this denotes a mechanical connection which has no appreciable backlash or lost motion therein.

I claim:

1. In a vehicle steering mechanism, in combination with a hand operable steering wheel, dirigible vehicle wheels and a direct mechanical connection between said hand wheel and said vehicle wheels, power operable means connected to said dirigible vehicle wheels, means operated by movement of said hand wheel to apply operating power to said power operable means and means operated by the operating power in response to a cessation of motion of both said hand wheel and said dirigible vehicle wheels to cut off operating power from said power operable means, the operation of said means for cutting off operating power being effected without movement of said hand wheel or said dirigible vehicle wheels.

2. In a vehicle steering mechanism, in combination with a hand operable steering wheel, an element for moving dirigible vehicle wheels and a direct mechanical connection between said hand wheel and said element, a fluid motor operatively connected to said element, means operated by movement of said hand wheel for supplying motive fluid to operate said fluid motor and means operated by the motive fluid supplied for shutting off the supply of motive fluid to such motor in response to a cessation of motion of said hand wheel, said element and said dirigible vehicle wheels, the operation of said means for shutting off the supply of motive fluid being effected without movement of said hand wheel or said dirigible vehicle wheels.

3. In a vehicle steering mechanism, in combination with a hand operable wheel, dirigible vehicle wheels and a mechanical connection between said hand wheel and said vehicle wheels, a fluid motor operatively connected to said mechanical connection, a valve for admitting motive fluid to said motor to operate the same, valve operating means releasably connected to said mechanical connection for opening said valve upon movement of said hand wheel and said connection, means for disconnecting said valve from said mechanical connection after said valve has been operated and means operated by motive fluid pressure in response to the simultaneous cessation of motion of the hand wheel, the mechanical connection and the dirigible vehicle wheels, for closing the valve.

4. In a vehicle steering mechanism, in combination with a steering shaft carrying a hand wheel, dirigible vehicle wheels and means for operatively connecting said shaft to said vehicle wheels, a fluid motor connected to move said dirigible wheels, a source of motive fluid for said motor, a valve for controlling the supply of motive fluid from said source to said motor, a valve operating element associated with said steering shaft, means operated by the movement of said shaft for rigidly connecting said element to said shaft whereby said valve is operated by movement of said shaft and means operated by the movement of said element in operating said valve for releasing said element from said shaft whereby movement of said shaft in excess of the movement required to operate said valve is unimpeded by said valve operating element.

5. In a vehicle steering mechanism, in combination with a steering shaft carrying a hand wheel, dirigible vehicle wheels and means for operatively connecting said shaft to said dirigible wheels, a reversible fluid motor connected to turn said dirigible vehicle wheels in either direction, a source of motive fluid for said motor, a valve for controlling the connection of said motive fluid source to said motor whereby said motor may be operated in a direction dependent upon the direction of movement of said valve, an arm associated with said steering shaft and connected to operate said valve, releasable locking means operated upon movement of said shaft in either direction to connect said arm to move with said shaft whereby said arm may be turned by said shaft to operate said valve and means operated by movement of said shaft to the extent required to operate said valve for releasing said locking means and so disconnecting said arm from said shaft.

6. In a vehicle steering mechanism, in combination with a steering shaft carrying a hand wheel, dirigible vehicle wheels and means for operatively connecting said shaft to said dirigible wheels, a reversible fluid motor connected to turn said dirigible vehicle wheels in either direction, a source of motive fluid for said motor, a valve for controlling the connection of said motive fluid source to said motor whereby said motor may be operated in a direction dependent upon the direction of movement of said valve, an arm associated with said steering shaft and connected to operate said valve, releasable locking means operated upon movement of said shaft in either direction to connect said arm to move with said shaft whereby said arm may be turned by said shaft to operate said valve, means operated by movement of said shaft to the extent required to operate said valve for releasing said locking means and so disconnecting said arm from said shaft and means operated in accordance with the magnitude of motive fluid pressure in said motor for moving said arm to a position in which said valve cuts off the supply of motive fluid to said motor.

7. In a vehicle steering mechanism, in combination with a hand steering wheel shaft, dirigible vehicle wheels and means for connecting said shaft to turn said wheels, a cylinder carrying a double acting piston, means for connecting said piston to turn said dirigible vehicle wheels, a source of motive fluid for said cylinder, a valve movable in either direction from a neutral closed position and acting when so moved to connect said source respectively to either end of said cylinder whereby said piston is moved in the direction dependent upon the direction of movement of said valve, an arm associated with said steering wheel shaft and connected to operate said valve, releasable locking means for connecting said arm to move with said shaft, means for releasing said locking means and so disconnecting said arm from said shaft after said arm has been moved to the extent required to operate said valve and means operated by a predetermined degree of motive fluid pressure in said cylinder for moving said arm to its neutral position after said locking means has been so released.

8. In a vehicle steering mechanism, in combination with a hand steering wheel shaft, dirigible vehicle wheels and means for connecting said shaft to turn said wheels, a cylinder carrying a double acting piston, means for connecting said piston to turn said dirigible vehicle wheels, a source of motive fluid for said cylinder, a valve having a neutral position and movable in either direction from said neutral position to opposite operating positions, said valve acting when in the neutral position to vent both ends of said cylinder to atmosphere and acting when in its respective operated positions to supply motive fluid from said source to either end of said cylinder respectively, an arm associated with said steering shaft connected to operate said valve, releasable locking means to cause said arm to move with said shaft when said shaft turns in either direction whereby turning of said shaft moves said valve to one of its operated positions, and means operated by the movement of said arm to either valve operating position for releasing said locking means whereby said shaft is freed from said arm after said valve is operated.

9. In a vehicle steering mechanism, in combination with a hand steering wheel shaft, dirigible vehicle wheels, and means for connecting said shaft to turn said wheels, a cylinder carrying a double acting piston, means for connecting said piston to turn said dirigible vehicle wheels, a source of motive fluid for said cylinder, a valve having a neutral position and movable in either direction from said neutral position to opposite operating positions, said valve acting when in the neutral position to vent both ends of said cylinder to atmosphere and acting when in its respective operated positions to supply motive fluid from said source to either end of said cylinder respectively, an arm associated with said steering shaft connected to operate said valve, releasable locking means to cause said arm to move with said shaft when said shaft turns in either direction whereby turning of said shaft moves said valve to one of its operated positions, means operated by the movement of said arm to either valve operating position for releasing said locking means whereby said shaft is freed from said arm after said valve is operated, and means operated by a predetermined degree of motive fluid pressure in said cylinder for returning said arm to its neutral position from either of its valve operating positions.

10. In a vehicle steering mechanism, in combination with a hand steering wheel, dirigible vehicle wheels and a mechanical connection between said hand wheel and said vehicle wheels, a fluid motor connected to turn said dirigible wheels, a source of motive fluid, a valve for controlling the flow of motive fluid between said source and said motor, said valve having an operated position in which said source is connected to said motor and a neutral closed position in which said source is cut off from said motor, means for transmitting motion from said mechanical connection to said valve for moving said valve to its operated position, and means operated by the motive fluid in response to the simultaneous cessation of movement of said hand wheel, said mechanical connection and said dirigible vehicle wheels for moving said valve to its neutral position only after said hand wheel, said mechanical connection and said dirigible wheels are all held stationary.

11. In a vehicle steering mechanism, in combination with a hand steering wheel, dirigible vehicle wheels and a mechanical connection between said hand wheel and said dirigible wheels, a reversible fluid motor connected to turn said dirigible wheels in either direction, a source of motive fluid, a valve for controlling the flow of motive fluid from said source to said motor, said valve having two operated positions which respectively connect said source to operate said motor in opposite directions and an intermediate neutral position in which said source is cut off from said motor, means for transmitting motion from said mechanical connection to said valve for moving said valve from its neutral position to either of its operated positions depending upon the direction of movement of said mechanical connection and means operable by the motive fluid in response to the simultaneous cessation of movement of said hand wheel, said mechanical connection and said dirigible vehicle wheels for moving said valve from either of its operated positions to its neutral position after said hand wheel, said mechanical connection and said dirigible wheels are all stationary.

12. In a vehicle steering mechanism, in combination with a hand steering wheel, dirigible vehicle wheels and a mechanical connection between said hand wheel and said vehicle wheels, a fluid motor connected to turn said dirigible wheels, a source of motive fluid, a valve for controlling the flow of motive fluid between said source and said motor, said valve having an operated position in which said source is connected to said motor and a neutral closed position in which said source is cut off from said motor, means for transmitting motion from said mechanical connection to said valve for moving said valve to its operated position, means for releasing said valve from said mechanical connection when said valve has been moved to its operated position and means operable by the operating fluid in response to the cessation of motion of said hand wheel, said mechanical connection and said dirigible vehicle wheels for moving said valve from its operated position to its neutral position after said mechanical connection, said hand wheel and said dirigible wheels are all stationary.

13. In a vehicle steering mechanism, in combination with a hand steering wheel, dirigible vehicle wheels and a mechanical connection between said hand wheel and said dirigible wheels, a reversible fluid motor connected to turn said dirigible wheels in either direction, a source of motive fluid, a valve for controlling the flow of motive fluid from said source to said motor, said valve having two operated positions which respectively connect said source to operate said motor in opposite directions and an intermediate neutral position in which said source is cut off from said motor, means for transmitting motion from said mechanical connection to said valve for moving said valve from its neutral position to either of its operated positions depending upon the direction of movement of said mechanical connection, means for releasing said valve from said mechanical connection when said valve has been moved from its neutral position to either of its operated positions and means operable by the operating fluid in response to the cessation of motion of said hand wheel, said mechanical connections and said dirigible vehicle wheels for moving said valve from either of its operated positions to its neutral position after said hand wheel, said mechanical connection and said dirigible wheels are all stationary.

14. In a vehicle steering mechanism, in combination with a steering shaft carrying a hand wheel and dirigible vehicle wheels, a mechanical connection between said shaft and said dirigible wheels including irreversible means for transmitting movement from said shaft to said dirigible wheels, a fluid motor connected to said mechanical connection between said dirigible wheels and said irreversible means, a source of motive fluid, a valve for controlling the flow of motive fluid between said source and said motor, said valve having an operated position in which said source is connected to said motor and a neutral position in which said source is cut off from said motor, means for transmitting motion from said mechanical connection to said valve for moving said valve to its operated position and means operated by the motive fluid pressure in said fluid motor in response to the cessation of movement of said fluid motor, said hand wheel, said shaft, said mechanical connection and said dirigible vehicle wheels for moving said valve to its neutral position after the fluid motor is held stationary by the stationary condition of the steering shaft.

15. In a vehicle steering mechanism, in combination with a steering shaft carrying a hand wheel, dirigible vehicle wheels and mechanism operatively connecting said shaft to move said dirigible wheels, a fluid motor connected to said connecting mechanism, a source of motive fluid, a valve for controlling the connection of said source to said motor, a valve operating element adjacent said steering shaft and movable with respect thereto and means for connecting said shaft to move said element comprising a surface on said element eccentric to said shaft and circular means disposed between said eccentric surface and said shaft.

16. In a vehicle steering mechanism, in combination with a steering shaft carrying a hand wheel, dirigible vehicle wheels and mechanism operatively connecting said shaft to move said dirigible wheels, a fluid motor connected to said connecting mechanism, a source of motive fluid, a valve for controlling the flow of motive fluid between said source and said motor, said valve having an operated position in which said source is connected to said motor, a valve operating arm associated with said steering shaft and movable with respect to said shaft, a head on said arm surrounding said shaft and providing a tapered recess between said shaft and said head, a roller in said recess for locking said head to said shaft upon rotation of said shaft whereby said valve is moved to its operated position by said shaft when said shaft is turned and means operated by movement of said arm to the valve operating position for moving said roller to release said head from said shaft.

17. In a vehicle steering mechanism, in combination with a manually operable steering wheel, a dirigible guiding element, a fluid motor connected to said dirigible element, a source of motive fluid, a valve for controlling the flow of motive fluid between said source and said motor, said valve having an operated position in which said source is connected to said motor, a valve operating element associated with said steering wheel and movable with respect thereto, means for locking said valve operating element to move with said wheel upon rotation of said wheel whereby said valve is moved to its operated position by said wheel when said wheel is turned and means operated by the movement of said valve operating element to its valve operated position for releasing said valve operating element from said wheel.

18. In a steering mechanism, in combination with a shaft carrying a manually operable steering wheel, a dirigible guiding element, a fluid motor connected to said dirigible element, a source of motive fluid, a valve for controlling the flow of motive fluid between said source and said motor, said valve having an operated position in which said source is connected to said motor, a valve operating arm associated with said shaft and movable with respect thereto, a head on said arm surrounding said shaft and providing a tapered recess between said shaft and said head, a roller in said recess for locking said head to said shaft upon rotation of said shaft whereby said valve is moved to its operated position by said shaft when said shaft is turned and means operated by movement of said arm to the valve operating position for moving said roller to release said head from said shaft.

GEORGE DOBSON.

CERTIFICATE OF CORRECTION.

Patent No. 1,990,530.                                February 12, 1935.

GEORGE DOBSON.

It is hereby certified that error appears in the printed specification of the above numbered patent requiring correction as follows: Page 1, first column, line 51, for "lower" read low; page 2, second column, line 45, for "each" read easy; and page 4, second column, line 32, strike out the word "and" second occurrence; and that the said Letters Patent should be read with these corrections therein that the same may conform to the record of the case in the Patent Office.

Signed and sealed this 12th day of March, A. D. 1935.

Leslie Frazer (Seal)                                    Acting Commissioner of Patents.